US009887921B2

(12) United States Patent
Thyni et al.

(10) Patent No.: US 9,887,921 B2
(45) Date of Patent: Feb. 6, 2018

(54) METHODS AND NODES FOR HANDLING CONGESTION IN BACKHAUL NETWORKS

(71) Applicant: TELEFONAKTIEBOLAGET L M ERICSSON (PUBL), Stockholm (SE)

(72) Inventors: Tomas Thyni, Järfälla (SE); Mozhgan Saffarzadeh, Sollentuna (SE); Annikki Welin, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 120 days.

(21) Appl. No.: 14/770,054

(22) PCT Filed: Mar. 1, 2013

(86) PCT No.: PCT/SE2013/050188
§ 371 (c)(1),
(2) Date: Aug. 24, 2015

(87) PCT Pub. No.: WO2014/133429
PCT Pub. Date: Sep. 4, 2014

(65) Prior Publication Data
US 2016/0014030 A1    Jan. 14, 2016

(51) Int. Cl.
*H04L 12/803*    (2013.01)
*H04L 12/801*    (2013.01)
(Continued)

(52) U.S. Cl.
CPC .......... *H04L 47/122* (2013.01); *H04L 47/11* (2013.01); *H04L 47/115* (2013.01);
(Continued)

(58) Field of Classification Search
None
See application file for complete search history.

(56) References Cited

U.S. PATENT DOCUMENTS 8,238,249 B2    8/2012  Kazmi et al.
8,243,679 B1 *  8/2012  Huang ............... H04W 36/30
                                                    370/331

(Continued)

FOREIGN PATENT DOCUMENTS

EP    2169994 A2    3/2010
GB    2454872 A     5/2009
JP    2008259046 A  10/2008

OTHER PUBLICATIONS

Ramakrishnan, et al., The Addition of Explicit Congestion Notification (ECN) to IP, RFC 3168, Sep. 2001, 64 pages.
(Continued)

*Primary Examiner* — Brian Roberts

(57) ABSTRACT

The present invention relates to nodes and method in such nodes of a Radio Access Network or a Backhaul Network connected to the Radio Access Network comprising a number of Radio Base Station nodes being connected to the Backhaul Network comprising communication paths for transferring data packets. There are nodes configured to support the performing of a method involving receiving a notification indicating congestion in one or more data paths of the Backhaul Network and deciding based on current radio information and data path information to initiate handover of data packet traffic from one Radio Base Station to another Radio Base Station for solving the congestion problem in the indicated one or more data communication paths.

20 Claims, 8 Drawing Sheets

(51) Int. Cl.
*H04W 36/00* (2009.01)
*H04W 36/30* (2009.01)
H04W 36/12 (2009.01)
H04W 36/22 (2009.01)
H04W 36/24 (2009.01)

(52) U.S. Cl.
CPC ....... *H04W 36/0005* (2013.01); *H04W 36/30* (2013.01); *H04W 36/12* (2013.01); *H04W 36/22* (2013.01); *H04W 36/24* (2013.01)

(56) References Cited

U.S. PATENT DOCUMENTS

| | | | |
|---|---|---|---|
| 2003/0119550 A1* | 6/2003 | Rinne | H04W 36/30 455/553.1 |
| 2004/0052212 A1* | 3/2004 | Baillargeon | H04L 1/0002 370/235 |
| 2005/0262266 A1 | 11/2005 | Wiberg et al. | |
| 2006/0159016 A1* | 7/2006 | Sagfors | H04L 47/12 370/230 |
| 2008/0026754 A1 | 1/2008 | Chang et al. | |
| 2008/0146237 A1* | 6/2008 | Shikama | H04W 36/32 455/438 |
| 2009/0023448 A1* | 1/2009 | Attar | H04W 36/0061 455/436 |
| 2009/0201810 A1 | 8/2009 | Kazmi et al. | |

OTHER PUBLICATIONS

Pascoal, Implementations and empirical comparison of K shortest loopless path algorithms, Nov. 2006, 16 pages.

* cited by examiner

METHODS AND NODES FOR HANDLING CONGESTION IN BACKHAUL NETWORKS

This application is a 371 of International Application No. PCT/SE2013/050188, filed Mar. 1, 2013, the disclosure of which is fully incorporated herein by reference.

TECHNICAL FIELD

The following disclosure relates to the technical field of communications network. The disclosure provides embodiments of methods and node configurations solving congestion problems in such networks comprising backhaul networks connected to radio access networks.

BACKGROUND

Congestion problems occur sometimes in communication networks comprising backhaul networks connected to radio access networks.

FIG. 1 is an illustration of a communications network. Said communications network 10 comprises a backhaul network 12, even denoted transport network, and a Radio Access Network, RAN, 14. As understood by the skilled person, said communications network 10 may comprise more than one backhaul network 12 and more than one RAN 14.

A communications network 10 provides transportation in two directions, uplinks and downlinks, for users having mobile User Equipment 24. The RAN 14 comprises one or more Radio Base Stations, RBSs, 20 or Access Points, APs, for enabling access for the UEs 24 via radio links in the air interface. These RBSs or APs are considered as nodes in the RAN, which nodes hereafter is denoted as RBS regardless if they comprise a RBS or an AP.

The mobile broadband traffic is growing, but the cost of building new transport network for small cells is very high. It is therefore desirable to solve capacity problems in the existing networks.

The tightest part in a radio network is not always the radio link. Transport/Backhaul/backbone/core networks, especially involving aggregation network structure, and the last mile can become a bottleneck. Operators may not be willing to build new networks for each of new small cell RBS sites; instead they are using existing networks, where overbooking is common, based on statistical multiplexing technique. E.g. all users are not using the network at same time With the small cell backhaul the congestion problem get even worst because a small cell backhaul network can be out of the control of the operator. E.g. all or a part of the backhaul network is leased or Internet is used as the backhaul.

SUMMARY

The object of the following disclosure is to provide solutions to congestion problems in communications networks comprising backhaul networks and radio access networks.

According one aspect of the following disclosure, method and embodiments of the method are provided, said embodiments are performed in a node of a Radio Access Network or a Backhaul Network connected to the Radio Access Network comprising a number of Radio Base Station nodes being connected to the Backhaul Network comprising data communication paths for transferring data packets. The method comprises identifying congestion in a data communications path of the Backhaul Network and notifying a handover control management functionality based on the congestion identification.

According to further one aspect of the following disclosure, a node entity and embodiments of the node entity are provided, said embodiments being situated in a Radio Access Network or a Backhaul Network connected to the Radio Access Network comprising a number of Radio Base Station nodes. The Radio Access Network is connected to the Backhaul Network comprising communication paths for transferring data packets. Said node entity comprises a congestion identifier being configured to identify congestion in a data communications path of the Backhaul Network, and a notification module being configured to notify a handover control management functionality based on the congestion identification.

According to further one aspect of the following disclosure, embodiments of a method are provided, said embodiments are performed in a node of a Radio Access Network or a Backhaul Network connected to the Radio Access Network. Said Radio Access Network comprises a number of Radio Base Station nodes being connected to the Backhaul Network comprising communication paths for transferring data packets. The method and embodiments involves receiving a notification indicating congestion in one or more data paths of the Backhaul Network, and deciding based on current radio information and data path information to initiate handover of data packet traffic from one Radio Base Station to another Radio Base Station for solving the congestion problem in the indicated one or more data paths.

According to yet one aspect of the following disclosure, embodiments of a node entity are provided, said node and embodiments being situated in a Radio Access Network or a Backhaul Network connected to the Radio Access Network. The Radio Access Network comprises a number of Radio Base Station nodes, which is connected to the Backhaul Network comprising communication paths for transferring data packets. The node and its embodiments comprise a handover control management functionality configured to receive a notification indicating congestion in one or more data paths of the Backhaul Network and a decision module configured to decide based on current radio information and data path information to initiate handover of data packet traffic from one Radio Base Station to another Radio Base Station for solving congestion problem in the one or more indicated data paths.

BRIEF DESCRIPTION OF THE DRAWINGS

The foregoing, and other, objects, features and advantages of the present invention will be more readily understood upon reading the following detailed description in conjunction with the drawings in which:

FIG. 3b is a flowchart illustrating embodiments of the sub-process in FIG. 3a;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

According to the following description, coordination between radio and transport networks resources is proposed to be able to get smooth throughput. A better user performance is achieved by combining information from transport/backhaul network and radio resources used in a specific area in the network.

Figure 1:
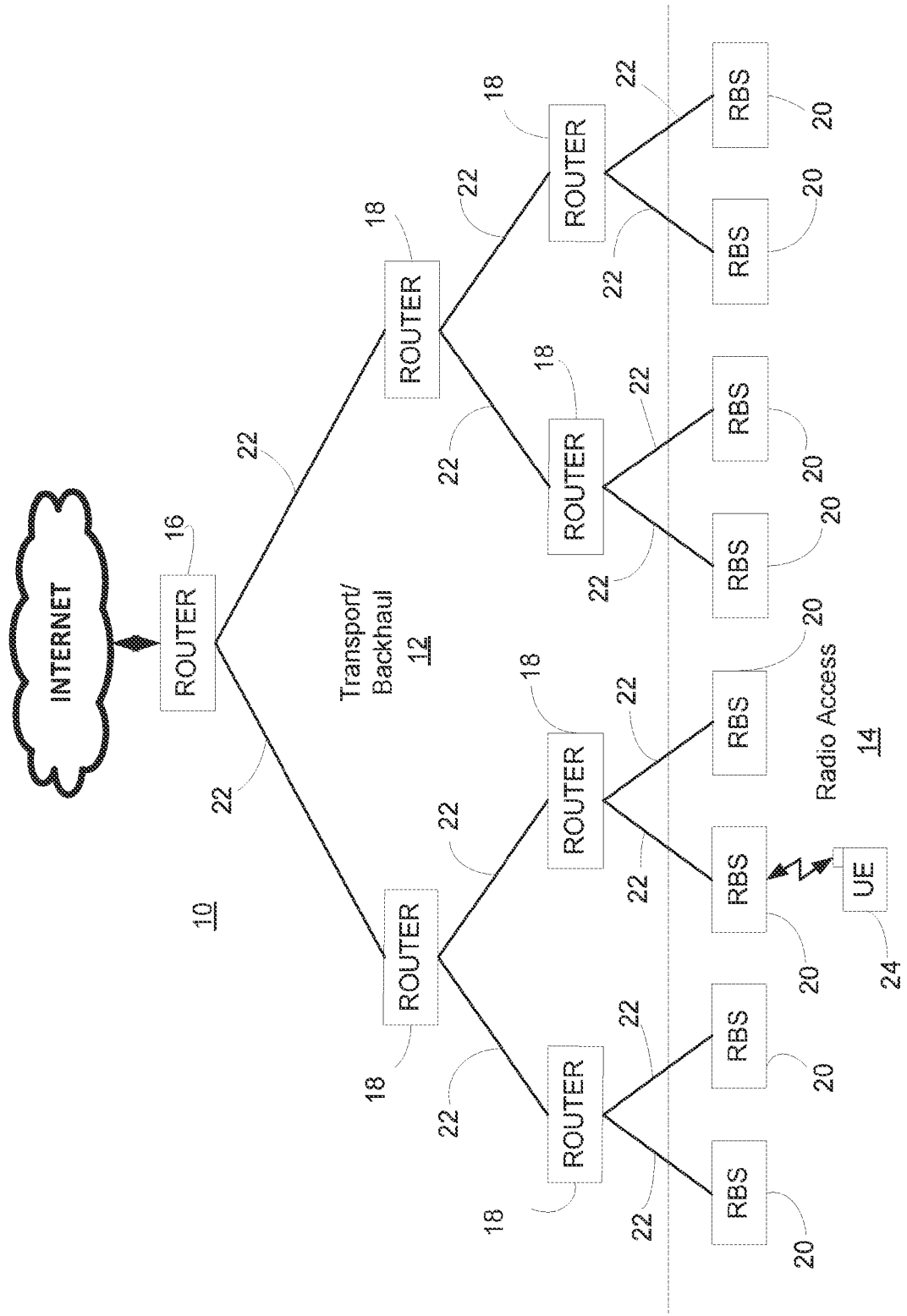
FIG. 1 is a block diagram of an exemplary network in which systems and methods described herein may be implemented.

FIG. 1 is an illustration of a communications network. Said communications network 10 comprises a backhaul network 12, even denoted transport network, and a Radio Access Network, RAN, 14. As understood by the skilled person, said communications network 10 may comprise more than one backhaul network 12 and more than one RAN 14.

A communications network 10 provides transportation in two directions, uplinks and downlinks, for users having mobile User Equipment 24. The RAN 14 comprises one or more Radio Base Stations, RBSs, 20 or Access Points, APs, for enabling access for the UEs 24 via radio links in the air interface. These RBSs or APs are considered as nodes in the RAN, which nodes hereafter is denoted as RBS regardless if they comprises a RBS or an AP.

Said RAN and RBSs may support one or more Radio Access Technologies, e.g. GSM, GPRS/EDGE, UMTS, WCDMA, HSPA, LTE (Long Term Evolution), WIFI. Thus, a RAN may be a combination of GSM Radio Access Network (GRAN), GSM/EDGE RAN (GERAN), UMTS RAN (UTRAN), Long Term Evolution RAN (E-UTRAN), and WiFi. Each RBS 20 may be able to support any of said radio access technologies.

Each RBS may be controlled by a centralized or distributed Radio Resource Management (RRM) Functionality, which determines and distributes Radio Resources to the User Equipment that request for a setup of a session. Said Radio Resource Management functionalities also handle handover between RBSs.

The RBSs 20 are linked to nodes 18 of a Backhaul network for enabling transport of data packets embedded in a suitable protocol in both the uplink direction from the UEs and in the downlink direction towards the UE. Said nodes 18 are intermediate nodes, which therefore comprise switching and routing means, here denoted as (intermediate) routers, for directing or routing data packet traffic to their addressed destination via data links 22.

The router nodes 18 and the RBS nodes 20 are connected via data links 22 for enabling transportation of the data packets in data sessions setup for the UEs. Said data links constitute a data path between a source node, e.g. an UE 24 sending data packets, and a destination node, either within the communications network or outside said network 10. The backhaul network is preferably connected to other communications networks, e.g. the Internet. The communications network 10 may be connected to another network via an end node 16 comprising a Packet Data Network Gateway (PDNGW) which also comprises a switching and/or routing functionality, such as a router. Thus, data communications paths are setup between the UEs 24 and the end node 16 via the RBSs through the network's links 22 and routers 18.

The nodes 16, 18 of the backhaul network may comprise a mechanism for detecting and handling congestion conditions, e.g. Active Queue Management (AQM). Said mechanism distributes congestion information in the network among nodes by means of the Explicit Congestion Notification (ECN) bit in the IP protocol.

As illustrated in FIG. 1, the communications network has a link aggregating structure in the uplink direction, thus constituting an aggregation network.

Figure 2:
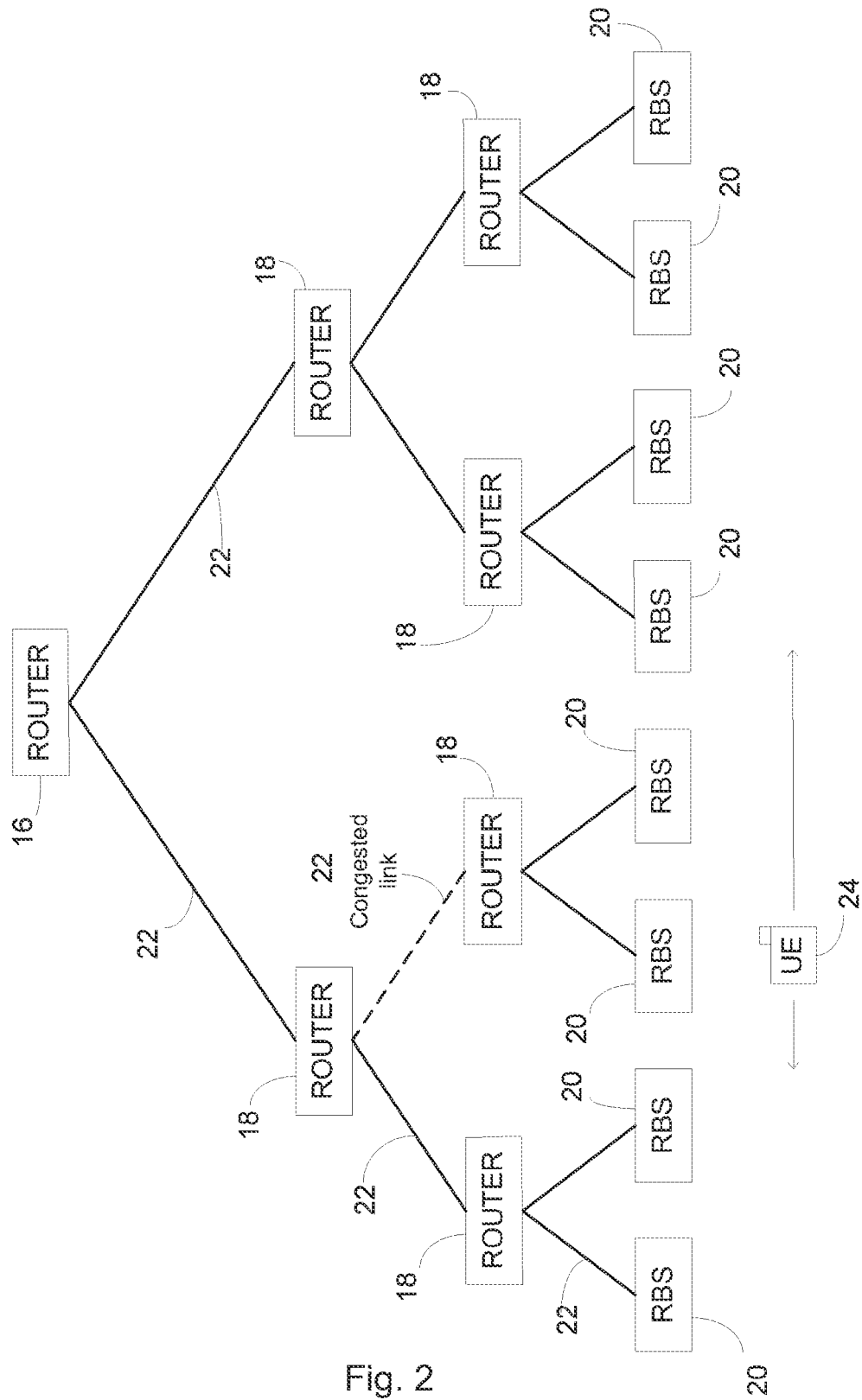
FIG. 2 is a block diagram of an exemplary network wherein a congestion situation occurred in a link.

FIG. 2 is illustrating a communications network similar to the above described communications network in FIG. 1.

One of the links is illustrated with a dashed line for indicating a link experiencing congestion symptom. Thus, there may be a data traffic overload in one of the directions, uplink or downlink, even in both directions at the same time. Hence, one of the routers is starting to store data packets in its buffer stores, which may result in data loss due to data packet overflow in said buffers. The router may be designed to drop data packets even before the buffers are full.

Congestion control concerns controlling traffic entry into a telecommunications network, so as to avoid congestive collapse by attempting to avoid oversubscription of any of the processing or link capabilities of the intermediate nodes and networks and taking resource reducing steps, such as reducing the rate of sending packets. It should not be confused with flow control, which prevents the sender from overwhelming the receiver.

There are a number of known mechanisms for solving a congestion situation in a link or decreasing the risk for congestion. The prevention of network congestion and collapse requires two major components:

1. A mechanism in routers to reorder or drop packets under overload,

2. End-to-end flow control mechanisms designed into the end points which respond to congestion and behave appropriately.

One of these mechanism is Explicit Congestion Notification (ECN), which is an extension to the Internet Protocol and to the Transmission Control Protocol (TCP) and is defined in RFC 3168 (2001). ECN allows end-to-end notification of network congestion without dropping packets. ECN is an optional feature that is only used when both endpoints support it and are willing to use it. It is only effective when supported by the underlying network.

Conventionally, TCP/IP networks solve congestion by dropping packets. When ECN is successfully negotiated, an ECN-aware router may set a mark in the IP header instead of dropping a packet in order to signal impending congestion. The receiver of the packet echoes the congestion indication to the sender, which reduces its transmission rate as though it detected a dropped packet.

ECN requires specific support at the Internet and Transport layers for the following reasons:

1. In TCP/IP routers operate mostly on the Internet layer while transmission rate is handled by the endpoints at the Transport layer 2. Congestion may be handled only by the transmitter but since it is known to have happened only after a packet was sent, there must be an echo of the congestion indication by the receiver to the transmitter.

Without ECN congestion indication echo is achieved indirectly by the detection of lost packets. With ECN, the congestion is indicated by setting the CE bits (see below) at an IP (Internet protocol) packet, e.g. data packet, and is echoed back by the receiver to the transmitter by setting proper bits in the Transport Layer's protocol header. For example, when using TCP, the congestion indication is echoed back by setting the ECE bit (see below).

ECN uses the two least significant (right-most) bits of the DiffServ field in the IPv4 or IPv6 header to encode four different code points:
  00: Non ECN-Capable Transport Non-ECT
  10: ECN Capable Transport ECT(0)
  01: ECN Capable Transport ECT(1)
  11: Congestion Encountered CE When both endpoints support ECN they mark their packets with ECT(0) or ECT(1). If the packet traverses an Active Queue Management (AQM) queue (e.g. a queue that uses random Explicit detection (RED)) that is experiencing congestion and the corresponding router supports ECN, it may change the code point to CE instead of dropping the packet. This act is referred to as "marking" and its purpose is to inform the receiving endpoint of impending congestion. At the receiving endpoint, this congestion indication is handled by the upper layer protocol (transport layer protocol) and needs to be echoed back to the transmitting node in order to signal it to reduce its transmission rate.

Because the CE indication can only be handled effectively by an upper layer protocol that supports it, ECN is only used in conjunction with upper layer protocols (e.g. TCP) that
  support congestion control and,
  have a method for echoing the CE indication to the transmitting endpoint.

TCP supports ECN using three flags in the TCP header. The first one, the Nonce Sum (NS), is used to protect against accidental or malicious concealment of marked packets from the TCP sender. The other two bits are used to echo back the congestion indication (i.e. signal the sender to reduce the amount of information it sends) and to acknowledge that the congestion-indication echoing was received. These are the ECN-Echo (ECE) and Congestion Window Reduced (CWR) bits.

Use of ECN on a TCP connection is optional; for ECN to be used, it must be negotiated at connection establishment by including suitable options.

When ECN has been negotiated on a TCP connection, the sender indicates that IP packets that carry TCP segments of that connection are carrying traffic from an ECN Capable Transport by marking them with an ECT code point. This allows intermediate routers that support ECN to mark those IP packets with the CE code point instead of dropping them in order to signal impending congestion.

Upon receiving an IP packet with the Congestion Experienced code point, the TCP receiver echoes back this congestion indication using the ECE flag in the TCP header. When an endpoint receives a TCP segment with the ECE bit it reduces its congestion window as for a packet drop. It then acknowledges the congestion indication by sending a segment with the CWR bit set.

A node keeps transmitting TCP segments with the ECE bit set until it receives a segment with the CWR bit set.

ECN is also defined for other transport-layer protocols that perform congestion control, notably Datagram Congestion Control Protocol (DCCP) and Stream Control Transmission Protocol (SCTP). The general principle is similar to TCP, although the details of the on-the-wire encoding differ.

It is possible to use ECN with protocols layered above UDP. However, UDP requires that congestion control be performed by the application, instead of the transport layer. Most radio technologies uses the UDP protocol as a transport and tunneling mechanism for transporting user data in data packets regardless of the end-user protocol used. To use the ECN detection on the UDP protocol the ECN information must be forwarded to the radio application, and the information must be signaled using new protocols or extensions to existing protocols in the RAN domain.

Many modern implementations of the TCP/IP protocol suite have some support for ECN; however, they usually ship with ECN disabled.

Since ECN marking in routers is dependent on some form of Active Queue Management, routers must be configured with a suitable queue discipline in order to perform ECN marking.

An Internet router typically maintains a set of queues, at least one per interface and Class of Service, which hold packets scheduled to go out on that interface. Historically, such queues use a drop-tail discipline: a packet is put onto the queue if the queue is shorter than its maximum size (measured in packets or in bytes), and dropped otherwise.

Active queue disciplines drop or mark packets before according to queue configuration management. Typically, they operate by maintaining one or more drop/mark probabilities, and probabilistically dropping or marking packets.

Drop-tail queues have a tendency to penalize bursty flows, and to cause global synchronisation between flows. By dropping packets probabilistically, AQM disciplines typically avoid both of these issues.

By providing endpoints with congestion indication before the queue is full, AQM disciplines are able to maintain a shorter queue length than drop-tail queues, which combats buffer bloat and reduces network latency.

A number of active queue management algorithms are known, e.g.:
  Adaptive Virtual Queue (AVQ);
  Random early detection (RED);
  Random Exponential Marking (REM);
  Blue and Stochastic Fair Blue (SFB);
  CHOKe;
  PI controller.
  Robust random early detection (RRED)
  RSFB: a Resilient Stochastic Fair Blue algorithm against spoofing DDoS attacks
  RED with Preferential Dropping (RED-PD)
  Controlled Delay (CoDel)

The prevention of network congestion and collapse requires two major components:

1. A mechanism in routers to reorder or drop packets under overload,

2. End-to-end flow control mechanisms designed into the end points which respond to congestion and behave appropriately.

However, for a communications network comprising RAN and transport/backhaul network there are no end-toend flow control mechanism today. The Management functionality of the RBSs does not comprise any mechanism which responds to transport/backhaul congestion information.

Thus, the following described aspects and embodiments provide methods and node entities such end-to-end flow control mechanisms which respond to congestion notification.

In the following, this disclosure presents a number of aspects and embodiments for initiating handover of one or more User Equipment between different Radio Base Stations. By initiating handover from a Radio Base Station connected to a data path wherein congestion is discovered or is close to occur for a link, data traffic to or from said one or more UEs may be moved to a RBS being connected to one or more data paths having bandwidth capacity for transporting user data in the data packets.

As already been described above, the nodes 16, 18 (see FIGS. 1 and 2) of the backhaul network may comprise a mechanism for detecting and handling congestion conditions, e.g. Active Queue Management (AQM). Further, it is known to distribute congestion information in the network among nodes by means of the Explicit Congestion Notification (ECN) bit in the IP protocol.

The following described embodiments are not limited to the use of AQM and ECN. Said mechanisms and methods are used as examples and not limitations.

In the following, a process and corresponding embodiments for initiating handover in communications network comprising a Radio Access Network and a Backhaul Network are described. Said process comprises one sub-process notifying a handover control management functionality based on the identification and another sub-process deciding based on current radio information and data path information regarding congestion in any data paths in the backhaul network to initiate handover of data packet traffic from one Radio Base Station to another Radio Base Station. Radio information is meant herein as Radio Frequency (RF) channel condition and Sector or RBS load, conditions and load data information are used for making a handover decisions according to different radio access technologies. Said sub-processes may be performed in different nodes or one and the same nodes of the communications network. In the following, the process is hereafter described in two sub-processes. Further, embodiments of nodes are described which nodes comprises means and components for supporting the process and its sub-processes.

Figure 3A:
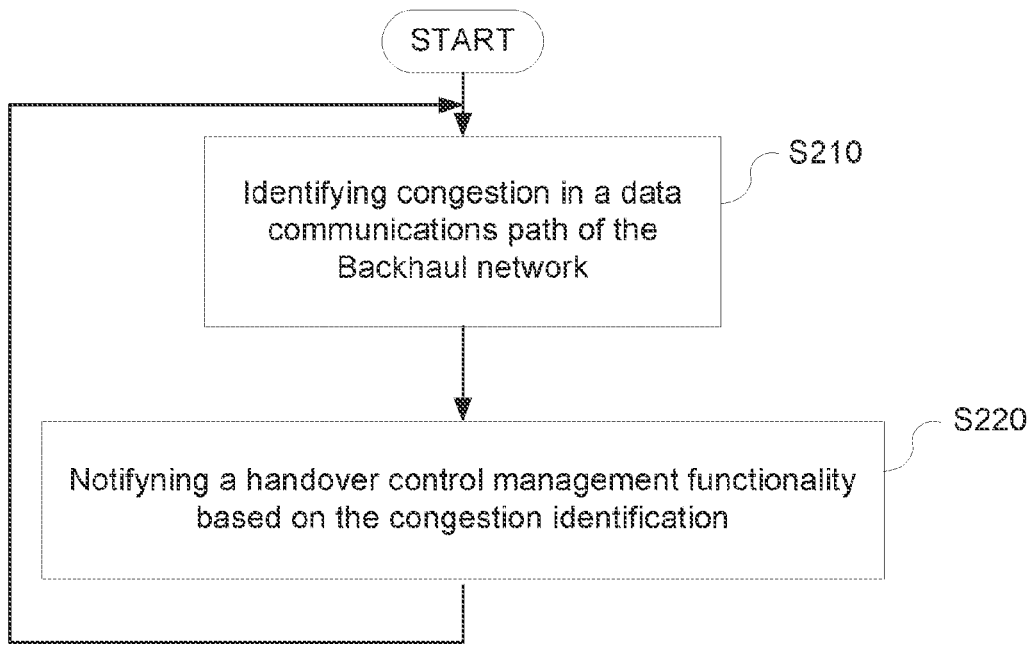
FIG. 3a is a flowchart illustrating embodiments of a sub-process according to one aspect of the disclosure.
Figure 3B:
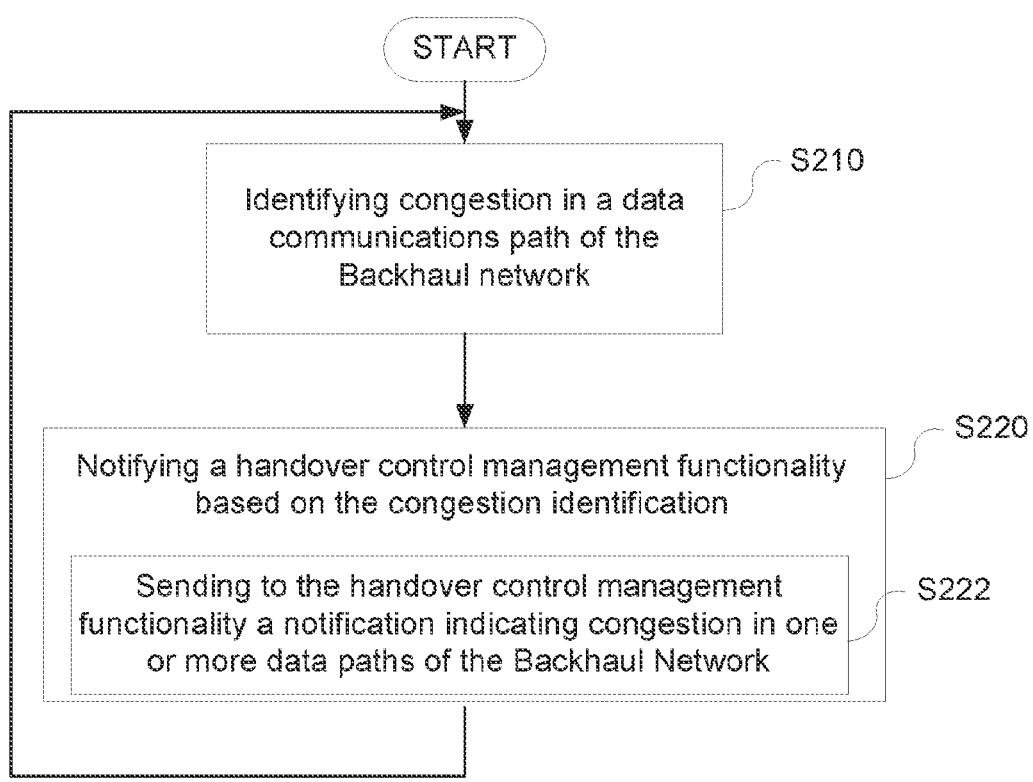

FIGS. 3*a* and 3*b* are flowchart illustrating embodiments of a method for enabling the solution of the congestion problem by means of initiating handover of UEs from one RBS to another RBS. The method could be performed in any of the nodes of a Radio Access Network or a Backhaul Network connected to the Radio Access Network comprising a number of Radio Base Station nodes being connected to the Backhaul Network comprising data communication paths for transferring data packets. The method comprises:

S210:—identifying congestion in a data communications path of the Backhaul Network. The identifying of congestion may be performed by a congestion identifier. According to some embodiments, the congestion identification may imply detecting data packets comprising Explicit Congestion Notifications (ECN) indicating congestion in the data communications path. According to further embodiments, the congestion identification may imply detecting a continuous sequence of data packets comprising Explicit Congestion Notifications indicating congestion in the data communications path. The node may therefore comprise a congestion identifier being configured to identify, i.e. detect and register, in/for any data communication path a continuous sequence of data packets comprising Explicit Congestion Notifications. If data packets having congestion notification in their headers are detected and registered, there may be congestion in the link. To achieve a more stable identification, the identification of congestion may be set to identify a continuous sequence of data packets comprising marked congestion bits. Single data packets having their congestion bits marked mixed with data packets comprising un-marked congestion bits may be received. To avoid instability and a network system that too often switches between an identified congestion state for a link and a normal state, the congestion identifier may be configured to detect a continuous sequence of data packets comprising marked congestion bits. The number of data packets in said continuous sequence may be selected freely and pre-set, e.g. by the operator of the network. Thus, the length of the continuous sequence may be selected to be at least two bits long, but preferably the sequence comprises considerably more data packets to achieve a stable congestion surveillance and notification functionality.

Thus, a condition may be set for identifying a congestion state in a link and for performing a notification of a handover control functionality. A condition test may therefore be configured. Said condition test may state, e.g. to notify a handover control management functionality of the congestion situation in a link if the number of data packets comprising Explicit Congestion Notifications is equal to or exceeds a predetermined number of data packets. If the number of data packets comprising Explicit Congestion Notifications is less than a predetermined number of data packets, no notification should be performed. The pre-set number may be considered as a threshold value in the condition test. However, such a condition test and threshold value may be considered as optional.

When the congestion identifier has identified a sequence of data packets indicating that congestion is present in a link of a data path, the sub-process performs:

S220:—notifying a handover control management functionality (RRM) based on the congestion identification. The node may therefore further comprise a notification module being configured to notify a handover control management functionality (RRM) based on the congestion identification. The handover control management functionality controls the handover of user packet traffic between different RBSs. This functionality is situated in a Radio Resource Management function (RRM) in a Radio Network Control (RNC) or Access Controller (WiFi) entity or even in the Radio Base Station itself, depending on which mobile communication standard that is used. The RRM entities control one or more RBSs.

According to this network configuration, the method and embodiments thereof, as illustrated in FIG. 3*b*, may comprise:

S222:—sending to the handover control management functionality a notification indicating congestion in one or more data paths of the Backhaul Network. In some embodiments, the congestion identifier and the notification module may be situated in the same node, e.g. a RBS node, as the handover control functionality. In this case, internal signalling or an internal message protocol may be used for notifying the handover control functionality, e.g. a LTE eNB.

In another embodiment, the congestion identifier and the notification module are situated in another node, e.g. a Packet Data Network Gateway (PDNGW) node a WCDMA NodeB (NB) or WIFI Access Point. In this case, a suitable message protocol may be used for notifying the handover control management functionality directly or indirectly. A direct notification protocol can be an extension to existing protocols such as Iub Node B Application Part (NBAP) between the NB and the RNC, the Control And Provisioning of Wireless Access Points (CAPWAP) protocol between the WiFi AP and the WiFi Access controller, or a GPRS Tunneling Protocol (GTP-U) between the PDNGW and the eNB according to LTE.

An indirect notification can be as an ECN echo encoded into the GTP-U protocol between the PDNGW and the eNB.

Figure 4:
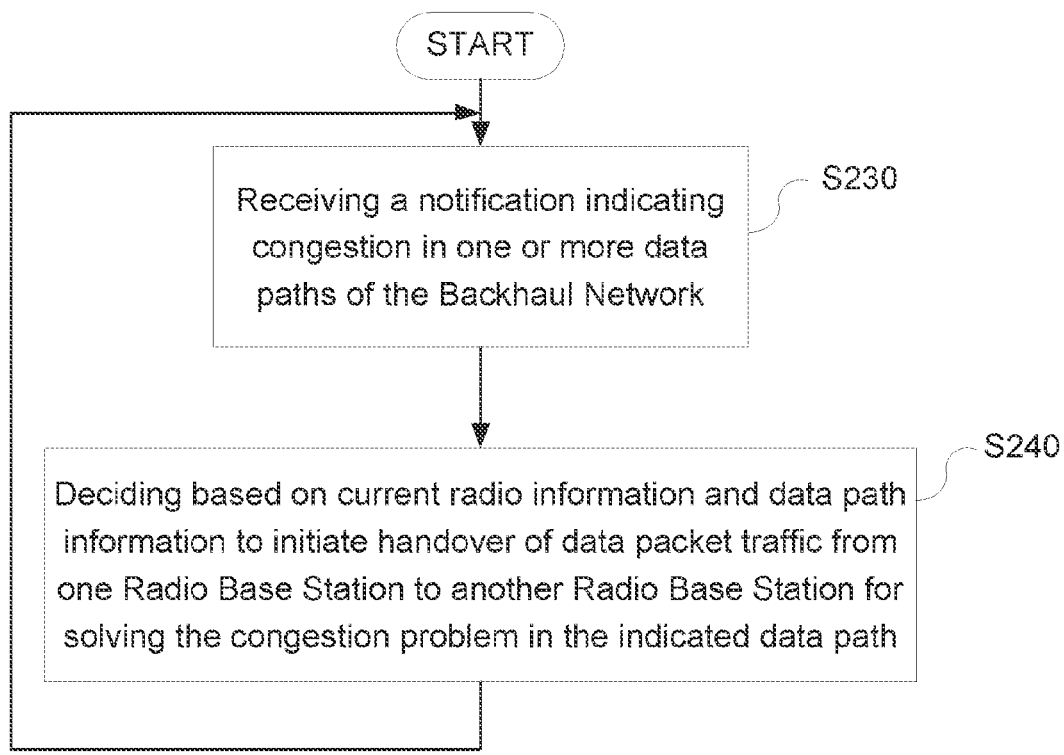
FIG. 4 is a flowchart illustrating embodiments of further one sub-process according to one aspect of the disclosure.

FIG. 4 is a flowchart illustrating the sub-process following the first of the two sub-processes.

Said sub-process is a method and embodiments thereof performed in a node of a Radio Access Network or a Backhaul Network connected to the Radio Access Network comprising a number of Radio Base Station nodes being connected to the Backhaul Network comprising communication paths for transferring data packets. Said sub-process comprises:

S230:—receiving a notification indicating congestion in one or more data paths of the Backhaul Network. The node comprises a handover control management functionality (RRM), which is configured to receive a notification indicating congestion in one or more data paths of the Backhaul Network. Said notification is received and forwarded to a decision module of the handover control functionality. The sub-process comprises further:

S240:—deciding based on current radio information and data path information to initiate handover of data packet traffic from one Radio Base Station to another Radio Base Station for solving the congestion problem in the indicated one or more data paths. The decision module is configured to decide based on current radio information and data path information to initiate handover of data packet traffic from one Radio Base Station to another Radio Base Station for solving congestion problems in the one or more indicated data paths. The decision may imply handover from one radio access technology to a different radio access technology.

As already described, the process for initiating handover may be performed in one single node of the communications network, or in different nodes of the network. As illustrated in the flowchart above, the process is possible to divide into sub-processes, which are distributed, e.g. by a network operator and/or network manager, to nodes in the communications network.

Different node configurations are possible. In the following, different node configurations for supporting the process and its embodiments described are hereafter described with reference to FIGS. 5 to 7. It is obvious that the nodes are only very schematically illustrated. Components and modules that are not necessary for the understanding of the different aspects and embodiments described herein have been left out.

Figure 5:
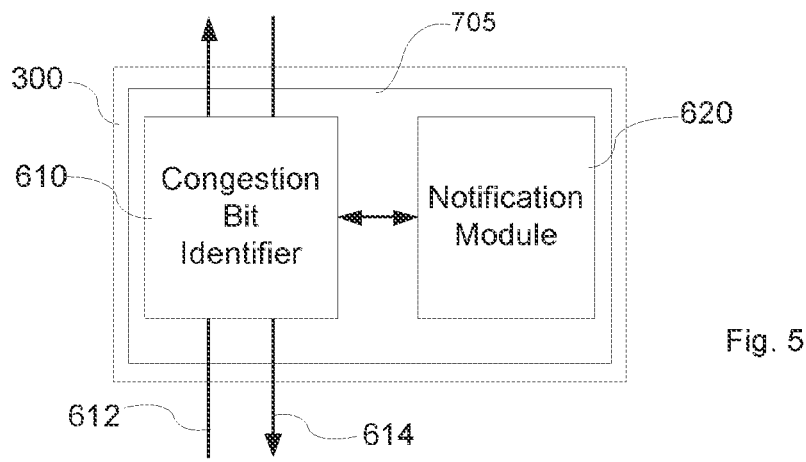
FIG. 5 is a block-diagram illustrating embodiments of a node configuration according to one aspect of the disclosure.

FIG. 5 is illustrating an embodiment of a node entity 300 of a Radio Access Network or a Backhaul Network. The backhaul network is connected to the Radio Access Network comprising a number of Radio Base Station nodes, said Radio Access Network being connected to the Backhaul Network comprising communication paths for transferring data packets. Said node is equipped for supporting the embodiments of the described sub-processes according to FIGS. 3a and 3b.

The node entity 300 comprises a congestion identifier 610 and a notification module 620. The node entity 300 may be implemented in digital electronically circuitry, or in computer hardware, firmware, software, or in combinations of them. According to one embodiment, the node entity 300 is implemented by means of a programmable processor 705 coupled to receive data and instructions from, and to transmit data and instructions to, a data storage system and via the data links 22. It is also capable of handling different data protocol.

The node may be located in an end node 16 comprising a Packet Network Gateway, see e.g. FIG. 1.

The congestion identifier 610 is configured to identify congestion in a data communications path of the Backhaul Network. In some embodiments, the congestion identifier is configured to identify for any data communication path a continuous sequence of data packets comprising Explicit Congestion Notifications, as described above in S210 of the flowchart in the figure. Thus, congestion identifier supports S210 of the process. The congestion identifier is able to locate and read the congestion bits, if they are marked or not, in the IP headers of the data packet traffic passing the node in either up-link or down-link directions. Said data packet traffic is indicated in FIG. 5 with arrows—up-link data packet traffic 612 and down-link data 614.

The notification module 620 supports and performs S220, i.e. it is configured to notify a handover control management functionality (RRM) based on the congestion identification. In some embodiments, the notification module 620 to notify a handover control management functionality (RRM) based on the identification of the data packets comprising Explicit Congestion Notifications. It is also able to perform S222 as described above.

According to some embodiment, the congestion identifier 610 is configured to detect a continuous sequence of data packets comprising marked congestion bits, which bits are described above. The number of data packets in said continuous sequence may be selected freely and pre-set, e.g. by the operator of the network. When the congestion identifier 610 has identified a sequence of data packets indicating that congestion is present in a link of a data path, the identifier 610 communicates with the notification module 620, which then performs S220 of the sub-process.

This functionality is situated in a Radio Resource Management function (RRM) in a Radio Network Control (RNC) or Access Controller (WiFi) entity or even in the Radio Base Station itself, depending on which mobile communication standard that is used. The RRM entities control one or more RBSs.

According to this network configuration, the method and embodiments thereof may comprise S222, wherein a notification indicating congestion in one or more data paths of the Backhaul Network is sent to the handover control functionality. This configuration is described in connection to and illustrated in FIG. 6. The notification is either sent over the connected links in the down-link 614 direction to the handover control functionality.

In some embodiments, the congestion identifier and the notification module may be situated in the same node, e.g. a RBS node, comprises the handover control functionality. In this case, internal signalling or an internal message protocol may be used for notifying the handover control functionality. This configuration is described and illustrated in FIG. 7.

Figure 6:
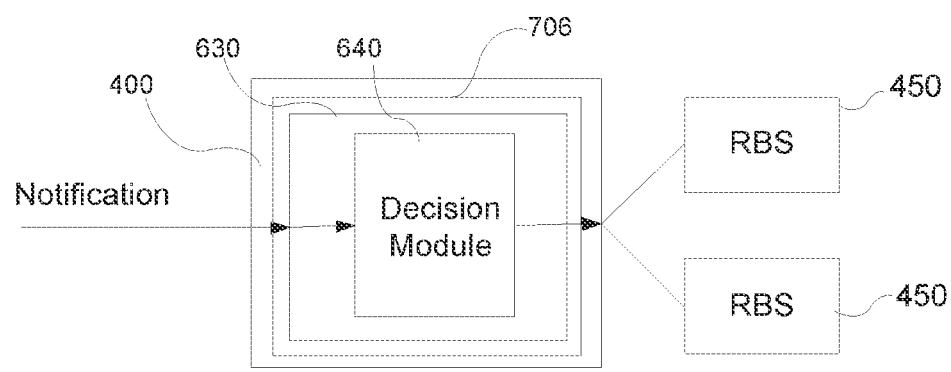
FIG. 6 is a block-diagram illustrating embodiments of further one node configuration according to one aspect of the disclosure.

FIG. 6 is illustrating an embodiment of a node entity 400 in a Radio Access Network or a Backhaul network. Said Backhaul network is connected to the Radio Access Network comprising a number of Radio Base Station nodes 450 being connected to the Backhaul Network comprising communication paths for transferring data packets.

The node entity 400 comprises a handover control management functionality 630, which is a part of RRM, situated in the controller. Said node entity 400 and handover control management functionality entity 630 are configured to receive a notification indicating congestion in one or more data paths of the Backhaul Network. The notification may be received via links in a data path connected to the node entity 400.

The node entity 400 further comprises a decision module 640 configured to decide based on current radio information and data path information to initiate handover of data packet traffic from one Radio Base Station 450 to another Radio Base Station 450 for solving congestion problem in the one or more indicated data paths. The node is therefore connected to one or more RBSs 450 and by means of the radio control management functionality 640, the node may initiate handover for a UE from one of its RBSs 450 to another of its RBSs 450.

The node entity 400 is therefore configured to perform the sub-process according to the flowchart in FIG. 4, which sub-process comprises as described above S230 and S240.

Regarding S240, the decision module 640 decides based on current radio information and data path information regarding congested link or links to initiate handover of data packet traffic from one Radio Base Station 450 to another Radio Base Station 450 for solving congestion problems in the one or more indicated data paths. The decision may imply handover from one radio access technology to a different radio access technology.

The node entity 400 may be implemented in digital electronically circuitry, or in computer hardware, firmware, software, or in combinations of them. According to one embodiment, the node entity 400 is implemented by means of a programmable processor 706 coupled to receive data and instructions from, and to transmit data and instructions to, a data storage system and via the data links 22. It is also capable of handling different data protocol.

Figure 7:
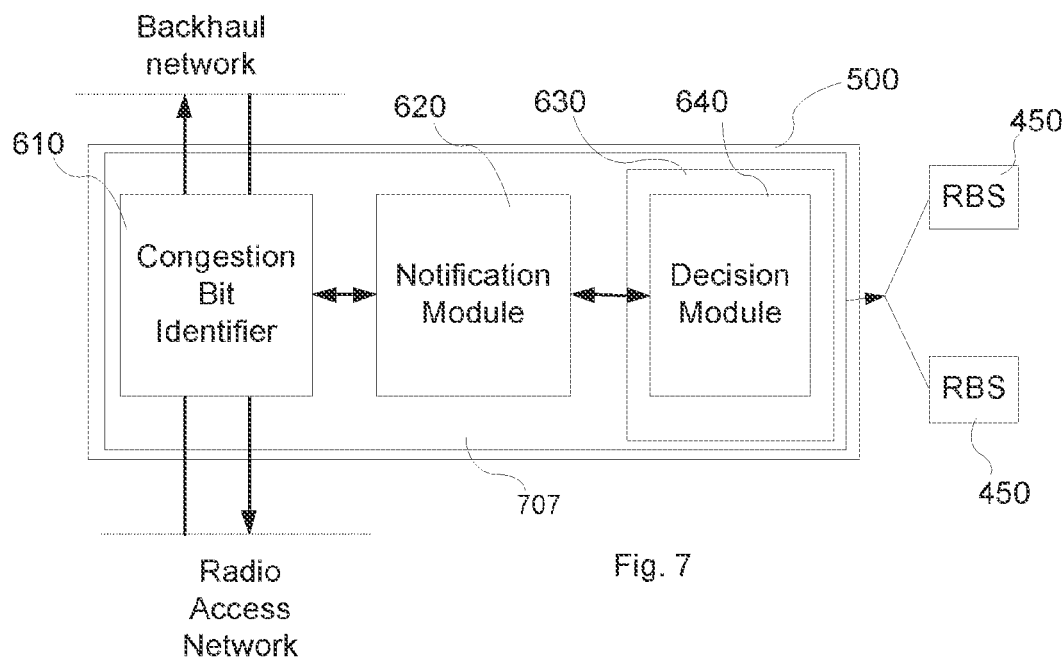
FIG. 7 is a block-diagram illustrating embodiments of further one node configuration according to one aspect of the disclosure.

FIG. 7 illustrates further one embodiment of a node entity 500. The node entity 500 comprises all the components of the node entities 300, 400 described above in connection to FIGS. 5 and 6.

Figure 8:
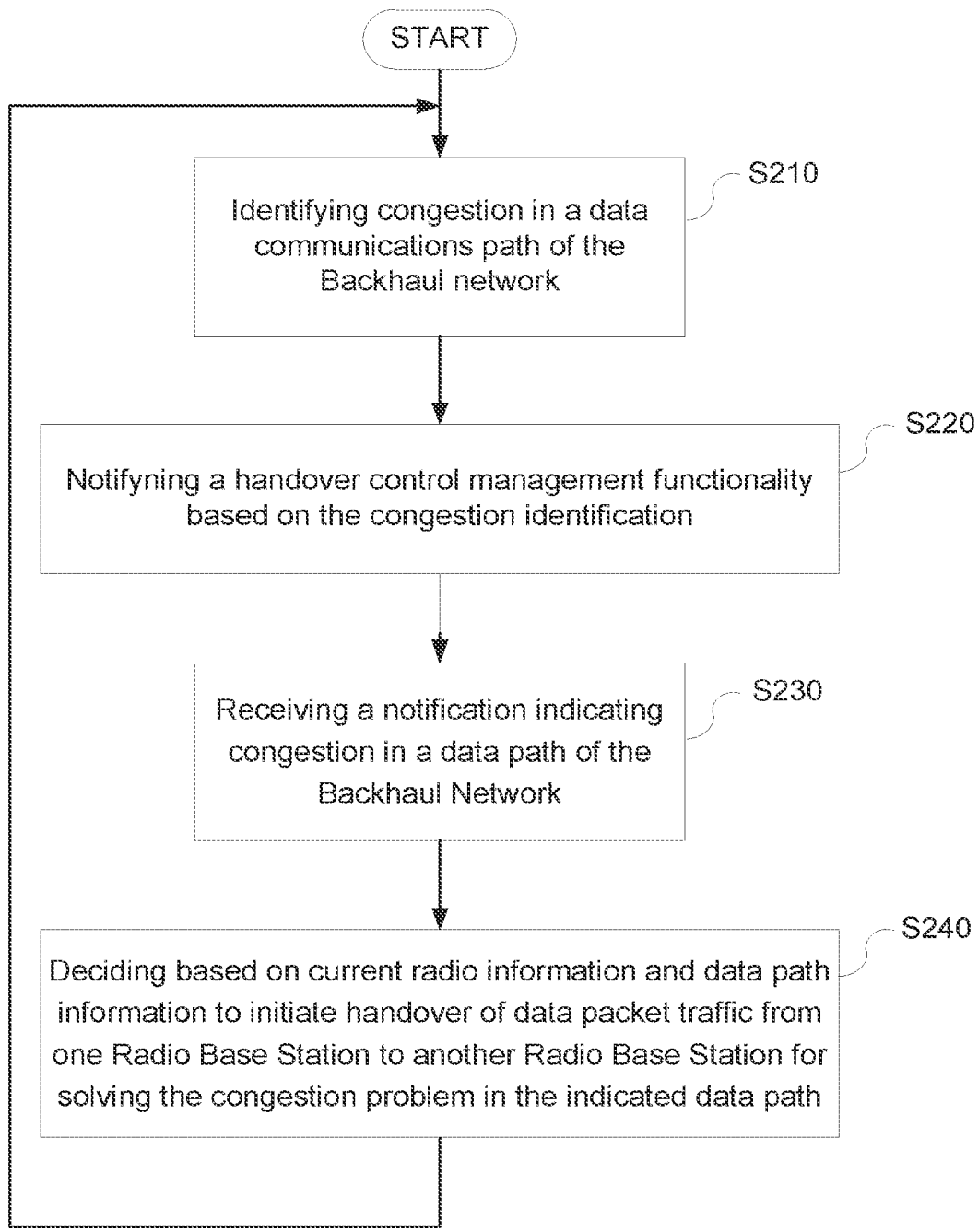
FIG. 8 is a flowchart illustrating embodiments of a process for initiating handover in a single node.

Thus, the node entity 500 comprises a congestion identifier 610, a notification module 620, a handover control management functionality 630 and a decision module 640. Said components have already been described above in connection to FIGS. 4 and 5. They may be implemented in digital electronically circuitry, or in computer hardware, firmware, software, or in combinations of them. According to one embodiment, the node entity 500 is implemented by means of a programmable processor 707 coupled to receive data and instructions from, and to transmit data and instructions to, a data storage system and via the data links 22. It is also capable of handling different data protocol. As all components are included in one single node, said node is capable of performing the whole process for initiating handover, i.e. both sub-processes comprising S210, S220, S230 and S240 and sub-steps thereof, which has been described above in connection to the flowcharts in FIGS. 3a, 3b and 4. The whole process for initiating handover, i.e. both sub-processes comprising S210, S220, S230 and S240 is illustrated in FIG. 8, a flowchart of the process for initiating handover performed in one single node such as illustrated in FIG. 7.

The node entities 300, 400 and 500 may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The described modules congestion identifier 610, a notification module 620, a handover control management functionality entity 630 and a decision module 640 and corresponding sub-processes may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially designed ASICs (Application Specific Integrated Circuits).

Figure 9:
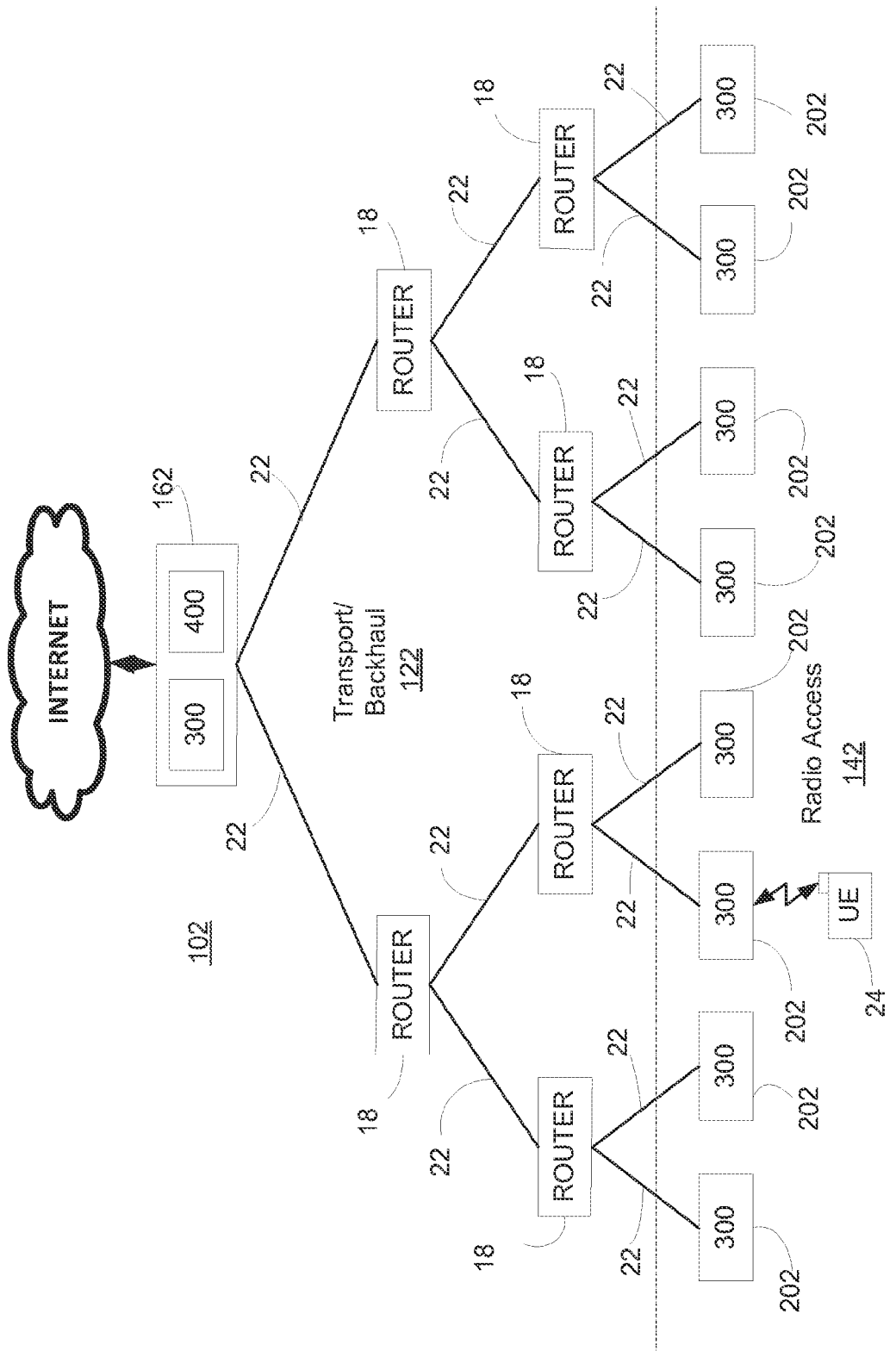
FIG. 9 is a block diagram of an exemplary communications network in which embodiments of node entities and methods have been implemented.

FIG. 9 is a block diagram of an exemplary network in which node entities and methods described above have been implemented.

The communications network 102 comprises a backhaul network 122, even denoted transport network, and a Radio Access Network, RAN, 142. As understood by the skilled person, said communications network 102 may comprise more than one backhaul network 122 and more than one RAN 142.

The backhaul network comprises intermediate nodes 18, links 22 connecting the nodes of the communications network 102, and an end node 162.

The communications network 102 provides transportation in two directions, uplinks and downlinks, for users having mobile User Equipment 24. The RAN 142 comprises one or more Radio Base Stations, RBSs, or Access Points, APs, 202 for enabling access for the UE 24 via radio links in the air interface.

Said RAN and RBSs may support one or more Radio Access Technologies, e.g. GSM, GPRS/EDGE, 3G, UMTS, WCDMA, HSPA, or WIFI. Thus, the RAN may be a combination of GSM Radio Access Network (GRAN), GSM/EDGE RAN (GERAN), UMTS RAN (UTRAN) or WiFi access network. Each RBS 202 may be able to support any of said radio access technologies. An RBS may therefore be a Node B, NB, supporting UMTS, or BTS (Base Transceiver Station) supporting GSM or an Access Point supporting WiFi.

Each RBS node 202 is controlled by a centralized Radio Resource Management (RRM) Functionality in a Radio Network Controller, RNC, or an Access Controller, AC, which determines and distributes Radio Resources to the User Equipment 24 that request for a setup of a session. The RNC and/or AC is located in the end node 162. Resource Management functionalities also handle handover between RBSs.

In this example, the RBS node 20 comprises the node entity 300 described in FIG. 5 for enabling congestion identification in the down-link direction and the end node 162 comprises both the node entity 300 for enabling congestion identification in the up-link direction and node entity 400 described in FIG. 6. In the up-link direction, the node entity 500 may be used.

Thus, when congestion occurs in a down-link direction, one of the intermediate nodes 18 detects the congestion and starts to mark the data packets for indicating congestion by means of its Active Queue Management (AQM). Said mechanism distributes congestion information in the network among nodes by means of e.g. Explicit Congestion Notification (ECN) bit in the user packet's IP protocol.

The node entity 300 is than able to perform the first sub-process for initiating handover:
  identifying congestion in a data communications path of the Backhaul Network, i.e. S210, by means of the congestion identifier 610, and by means of the notification module 620, the node entity performs S220:
  notifying a handover control management functionality (RRM) based on the congestion identification.

A direct notification protocol may be used, e.g. an Iub NBAP between the NB and the RNC, or an CAPWAP protocol between the WiFi AP and the WiFi Access controller. Said existing protocols may have an extension to indicate congestion for the RNC or Access Controller in node 162.

When the end node 162 receives the notification, the node entity 400 is therefore configured to perform the sub-process according to the flowchart in FIG. 4, which sub-process comprises as described above S230 and S240, i.e.:
  receiving a notification indicating congestion in one or more data paths of the Backhaul Network (S230);
  deciding based on current radio information and data path information to initiate handover of data packet traffic from one Radio Base Station to another Radio Base Station for solving the congestion problem in the indicated one or more data paths (S240).

Thus, the handover control management functionality (RRM) entity 630 receives the notification indicating congestion in one or more data paths of the Backhaul Network and the decision module 640 decides based on current radio information and data path information to initiate handover of data packet traffic from one Radio Base Station to another Radio Base Station for solving the occurred congestion problem in the one or more indicated data paths. The RRM is able to negotiate with different RBSs before the handover to another RBS is initiated.

If congestion occurs in the uplink direction, one of the intermediate nodes 180 detects the congestion and starts to mark the data packets for indicating congestion by means of its Active Queue Management (AQM). Said mechanism distributes congestion information in the network among nodes by means of e.g. Explicit Congestion Notification (ECN) bit in the user packet's IP protocol.

The node entity 300 is than able to perform the first sub-process for initiating handover:
  identifying congestion in a data communications path of the Backhaul Network, i.e. S210, by means of the congestion identifier 610, and by means of the notification module 620, the node entity performs S220:
  notifying a handover control management functionality (RRM) based on the congestion identification.

A direct notification protocol may be used, e.g. an Iub NBAP between the NB and the RNC, or an CAPWAP protocol between the WiFi AP and the WiFi Access controller. Said existing protocols may have an extension to indicate congestion for the RNC or AP in node 162.

When the end node 162 receives the notification, the node entity 400 is therefore configured to perform the sub-process according to the flowchart in FIG. 4, which sub-process comprises as described above S230 and S240, i.e.:
  receiving a notification indicating congestion in one or more data paths of the Backhaul Network (S230);
  deciding based on current radio information and data path information to initiate handover of data packet traffic from one Radio Base Station to another Radio Base Station for solving the congestion problem in the indicated one or more data paths (S240).

Thus, the handover control management functionality (RRM) entity 630 receives the notification indicating congestion in one or more data paths of the Backhaul Network and the decision module 640 decides based on current radio information and data path information to initiate handover of data packet traffic from one Radio Base Station to another Radio Base Station for solving the occurred congestion problem in the one or more indicated data paths. The RRM is able to negotiate with different RBSs before the handover to another RBS is initiated.

Figure 10:
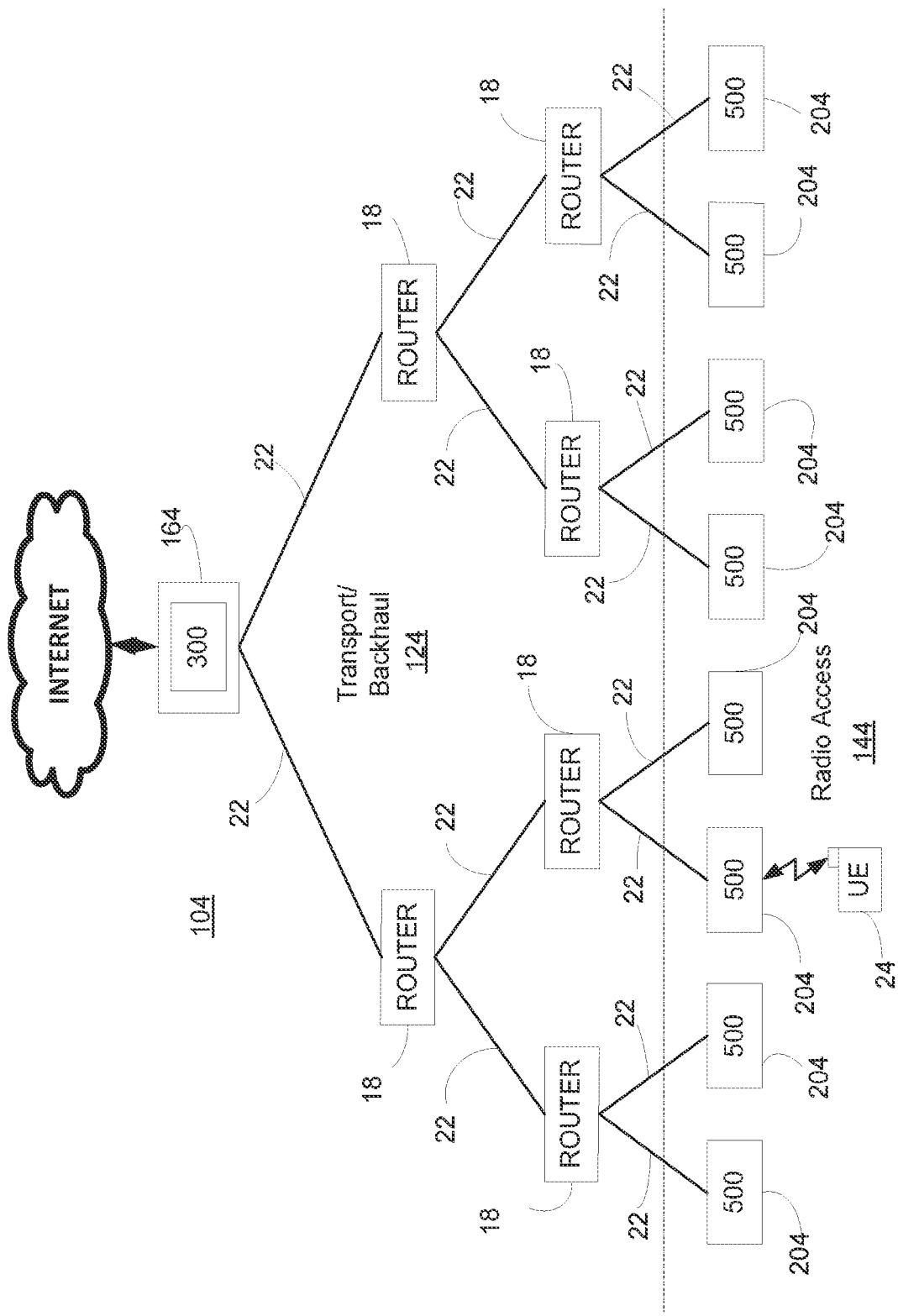
FIG. 10 is a block diagram of another exemplary network in which embodiments of node entities and methods have been implemented.

FIG. 10 is a block diagram of an exemplary network 104 in which node entities and methods described above have been implemented.

The communications network 104 comprises a backhaul network 124, even denoted transport network, and a Radio Access Network, RAN, 144. As understood by the skilled person, said communications network 104 may comprise more than one backhaul network 124 and more than one RAN 144.

The communications network 104 provides transportation in two directions, uplinks and downlinks, for users having mobile User Equipment 24. The RAN 144 comprises one or more Radio Base Stations, RBSs, 204 for enabling access for the UEs 24 via radio links in the air interface.

In the exemplified network 104, said RAN 144 is adapted to support LTE (Long Term Evolution). Thus, a RAN is a Long Term Evolution RAN (E-UTRAN).

The RBSs are eNode Bs, eNBs, supporting the LTE standard. Each eNB comprises and is controlled by a Radio Resource Management (RRM) Functionality. Said Radio Resource Management functionalities handle handover between the eNBs.

In the LTE backhaul network, the end node 164 comprises a Packet Data Network Gateway (PDNGW).

The eNB node 204 comprises the node entity 500 described in FIG. 7 for enabling congestion identification in the down-link direction and the end node 164 comprises the node entity 300 for enabling congestion identification in the up-link direction described in FIG. 5.

Thus, when congestion occurs in a down-link direction, one of the intermediate nodes 18 detects the congestion and starts to mark the data packets for indicating congestion by means of its Active Queue Management (AQM). Said mechanism distributes congestion information in the network among nodes by means of e.g. Explicit Congestion Notification (ECN) bit in the user packet's IP protocol.

The node entity 500 is than able to perform the whole handover initiation process, i.e. both the first sub-process and second process for initiating handover:
  identifying congestion in a data communications path of the Backhaul Network, i.e. S210, by means of the congestion identifier 610, and by means of the notification module 620, the node entity performs S220:

notifying a handover control management functionality (RRM) based on the congestion identification;
receiving a notification indicating congestion in one or more data paths of the Backhaul Network, as in S230; and S240 by means of the decision module 640:
deciding based on current radio information and data path information to initiate handover of data packet traffic from one Radio Base Station to another Radio Base Station for solving the congestion problem in the indicated one or more data paths.

Thus, the handover control management functionality (RRM) entity 630 receives the notification indicating congestion in one or more data paths of the Backhaul Network and the decision module 640 decides based on current radio information and data path information to initiate handover of data packet traffic from one Radio Base Station to another Radio Base Station for solving the occurred congestion problem in the one or more indicated data paths. The RRM is able to negotiate with different RBSs before the handover to another RBS is initiated.

If congestion occurs in the uplink direction, one of the intermediate nodes 18 detects the congestion and starts to mark the data packets for indicating congestion by means of its Active Queue Management (AQM). Said mechanism distributes congestion information in the network among nodes by means of e.g. Explicit Congestion Notification (ECN) bit in the user packet's IP protocol.

The node entity 300 is than able to perform the first sub-process for initiating handover:
identifying congestion in a data communications path of the Backhaul Network, i.e. S210, by means of the congestion identifier 610, and by means of the notification module 620, the node entity performs S220:
notifying a handover control management functionality (RRM) based on the congestion identification.

A direct notification protocol may be used, e.g. GTP-U protocol between the PDNGW and the eNB. Said existing protocols may have an extension to indicate congestion for the eNB in node 164.

When the end node 204 receives the notification, the node entity 500 is therefore configured to perform the sub-process according to the flowchart in FIG. 4, which sub-process comprises as described above S230 and S240, i.e.:
receiving a notification indicating congestion in one or more data paths of the Backhaul Network (S230);
deciding based on current radio information and data path information to initiate handover of data packet traffic from one Radio Base Station to another Radio Base Station for solving the congestion problem in the indicated one or more data paths (S240).

Thus, the handover control management functionality (RRM) entity 630 receives the notification indicating congestion in one or more data paths of the Backhaul Network and the decision module 640 decides based on current radio information and data path information to initiate handover of data packet traffic from one Radio Base Station to another Radio Base Station for solving the occurred congestion problem in the one or more indicated data paths. The RRM is able to negotiate with different RBSs before the handover to another RBS is initiated.

The described embodiments of a process and corresponding embodiments for initiating handover in communications network comprising a Radio Access Network and a Backhaul Network enables:
1) The notification of a handover control management functionality based on the identification of congestion; and 2) Making decisions based on current radio information and data path information, i.e. information regarding congestion situation in backhaul network, for initiating handover of data packet traffic from one Radio Base Station to another Radio Base Station. Radio information is meant herein as Radio Frequency (RF) channel condition and Sector or RBS load, conditions and load data information are used for making a handover decisions according to different radio access technologies.

A number of embodiments of the present processes and nodes have been described. It will be understood that various modifications may be made without departing from the scope of the embodiments described herein. Therefore, other implementations are within the scope of the following claims.

The invention claimed is:
1. A method in a node of a Radio Access Network comprising a number of Radio Base Station nodes being connected to a Backhaul Network, or a node of the Backhaul Network comprising data communications paths for transferring data packets, the method comprises:
identifying congestion in one of the data communications paths of the Backhaul Network, wherein the identifying congestion in the one data communications path of the Backhaul Network includes detecting data packets comprising Explicit Congestion Notifications indicating congestion in the one data communications path, and wherein the identifying congestion in the one data communications path of the Backhaul Network includes detecting a continuous sequence of data packets comprising the Explicit Congestion Notifications indicating congestion in the one data communications path; and,
notifying a handover control management functionality based on the congestion identification, wherein the notifying is performed based on a number of data packets comprising the Explicit Congestion Notifications in the continuous sequence being equal to or exceeding a predetermined number of data packets.

2. The method according to claim 1, wherein the notifying comprises:
sending to the handover control management functionality a notification indicating congestion in the one data communications path of the Backhaul Network.

3. The method according to claim 1, wherein the notification is a direct notification protocol comprising one of an Iub Node B Application Part (NBAP), a Control and Provisioning of Wireless Access Points (CAPWAP) protocol, or a General Packet Radio Service (GPRS) Tunneling Protocol (GTP-U), the protocols comprising an extension for indicating congestion.

4. The method according to claim 1, wherein the handover control management functionality controls handover of user packet traffic between the Radio Base Station nodes.

5. The method according to claim 1, wherein the Backhaul Network further comprises a plurality of routers.

6. A node of a Radio Access Network comprising a number of Radio Base Station nodes being connected to a Backhaul Network, or a node of the Backhaul Network comprising data communications paths for transferring data packets, said node comprising:
a processor; and,
a memory that stores processor-executable instructions, wherein the processor interfaces with the memory to execute the processor-executable instructions, whereby the node is operable to:

identify congestion in one of the data communications paths of the Backhaul Network, wherein the node is further operable to identify congestion in the one data communications path of the Backhaul Network by detecting data packets comprising Explicit Congestion Notifications indicating congestion in the one data communications path, and wherein the node is further operable to detecting a continuous sequence of data packets comprising the Explicit Congestion Notifications indicating congestion in the one data communications path; and notify a handover control management functionality based on the congestion identification, wherein the node is further operable to notify the handover control management functionality based on a number of data packets comprising the Explicit Congestion Notifications in the continuous sequence equal to or exceeding a predetermined number of data packets.

7. The node according to claim 6, wherein the node is further operable to send to the handover control management functionality a notification indicating congestion in the one data communications path of the Backhaul Network.

8. The node according to claim 6, wherein the notification is a direct notification protocol comprising one of an Iub Node B Application Part (NBAP), a Control and Provisioning of Wireless Access Points (CAPWAP) protocol, or a General Packet Radio Service (GPRS) Tunneling Protocol (GTP-U), the protocols comprising an extension for notifying congestion.

9. The node according to claim 6, wherein the handover control management functionality controls handover of user packet traffic between the Radio Base Station nodes.

10. The node according to claim 6, wherein the Backhaul Network further comprises a plurality of routers.

11. A method in a node of a Radio Access Network comprising a number of Radio Base Station nodes being connected to a Backhaul Network, or a node of the Backhaul Network comprising data communications paths for transferring data packets, the method comprises:

identifying congestion in one of the data communications paths of the Backhaul Network, wherein the identifying congestion in the one data communications path of the Backhaul Network includes detecting data packets comprising Explicit Congestion Notifications indicating congestion in the one data communications path, and wherein the identifying congestion in the one data communications path of the Backhaul Network includes detecting a continuous sequence of data packets comprising the Explicit Congestion Notifications indicating congestion in the one data communications path;

notifying a handover control management functionality based on the congestion identification indicating congestion in the one data communications path of the Backhaul Network, wherein the notifying is performed based on a number of data packets comprising the Explicit Congestion Notifications in the continuous sequence being equal to or exceeding a predetermined number of data packets; and, deciding based on radio information and data path information to initiate handover of data packet traffic from one of the Radio Base Stations to another of the Radio Base Stations.

12. The method according to claim 11, wherein the deciding to initiate the handover further includes handing over from one radio access technology to a different radio access technology.

13. A node of a Radio Access Network comprising a number of Radio Base Station nodes being connected to a Backhaul Network, or a node of the Backhaul Network comprising data communications paths for transferring data packets, the node comprising:

a processor; and, a memory that stores processor-executable instructions, wherein the processor interfaces with the memory to execute the processor-executable instructions, whereby the node is operable to:

identify congestion in one of the data communications paths of the Backhaul Network, wherein the node is further operable to identify the congestion in the one data communications path of the Backhaul Network by detecting data packets comprising Explicit Congestion Notifications (ECN) indicating congestion in the one data communications path, and wherein the node is further operable to identify the congestion in the one data communications path by detecting a continuous sequence of data packets comprising the Explicit Congestion Notifications indicating congestion in the one data communications path;

notify a handover control management functionality based on the congestion identification indicating congestion in the one data communications path of the Backhaul Network, wherein the node is further operable to notify the handover control management functionality based on a number of data packets comprising the Explicit Congestion Notifications in the continuous sequence being equal to or exceeding a predetermined number of data packets; and, decide based on radio information and data path information to initiate handover of data packet traffic from one of the Radio Base Stations to another of the Radio Base Stations.

14. The method according to claim 11, wherein the Backhaul Network further comprises a plurality of routers.

15. The method according to claim 11, wherein the handover control management functionality controls handover of user packet traffic between the Radio Base Station nodes.

16. The node according to claim 13, wherein the node is operable to send to the handover control management functionality a notification indicating congestion in the one data communications path of the Backhaul Network.

17. The node according to claim 13, wherein the node is operable to initiate the handover from one radio access technology to a different radio access technology.

18. The node according to claim 13, wherein said node being situated in the radio access network.

19. The node according to claim 13, wherein the handover control management functionality controls handover of user packet traffic between the Radio Base Station nodes.

20. The node according to claim 13, wherein the Backhaul Network further comprises a plurality of routers.

* * * * *